F. W. BULL.
ADJUSTABLE SECTIONAL MOLD.
APPLICATION FILED OCT. 19, 1912.
1,077,971.
Patented Nov. 11, 1913.
3 SHEETS—SHEET 1.
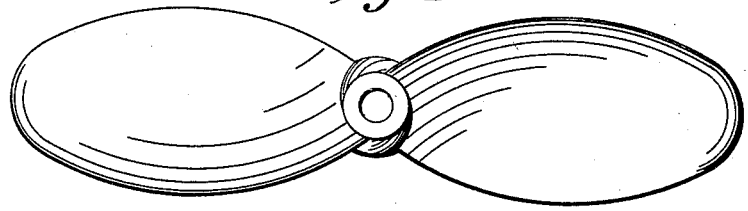
Fig-1-
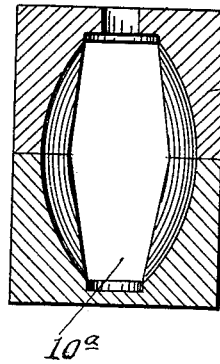
Fig-3-
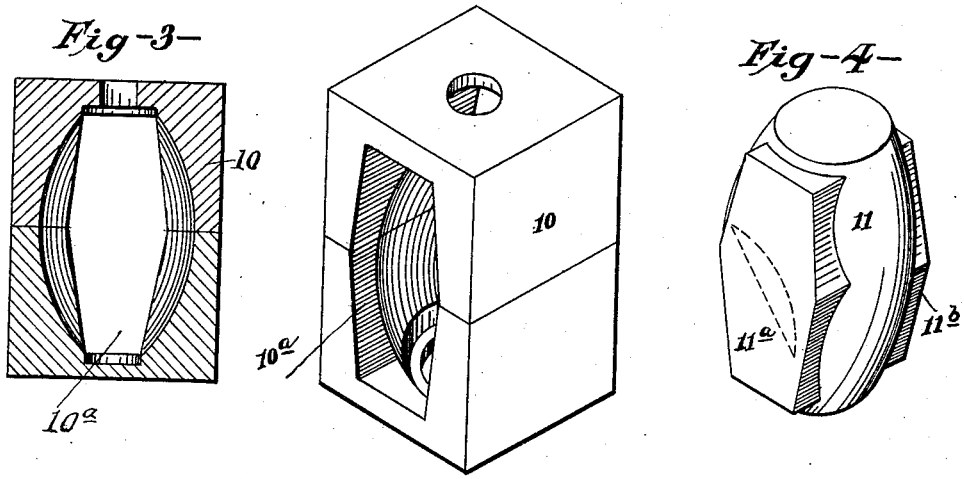
Fig-2-
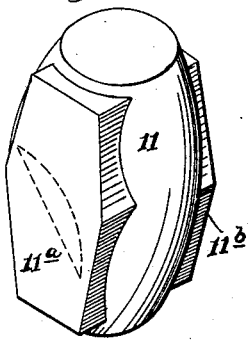
Fig-4-
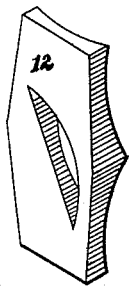
Fig-6-
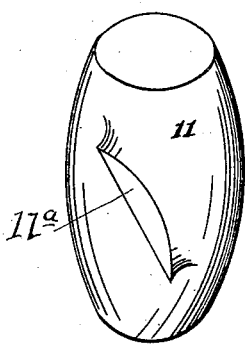
Fig-5-
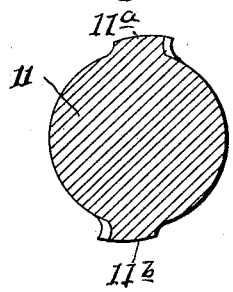
Fig-7-
WITNESSES:
Arthur B. Wilcox.
Elsie P. Grunert.
INVENTOR
Frederick W. Bull,
BY Frank H. Allen
ATTORNEY.

F. W. BULL.
ADJUSTABLE SECTIONAL MOLD.
APPLICATION FILED OCT. 19, 1912.
1,077,971.
Patented Nov. 11, 1913.
3 SHEETS—SHEET 2.
Fig-8-  Fig-9-  Fig-10-
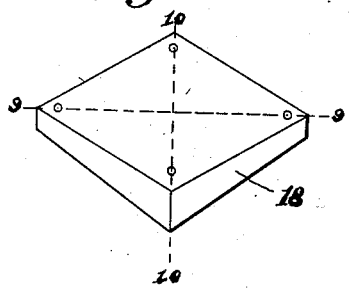 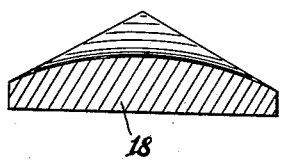 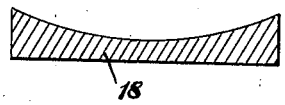
Fig-11-  Fig-12-  Fig-13-
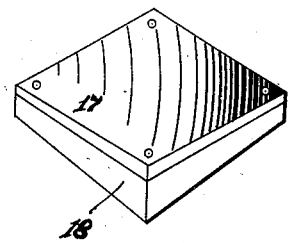  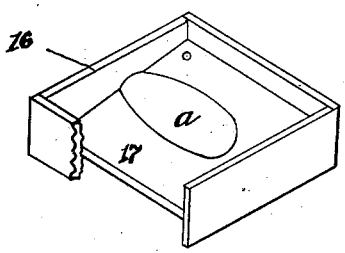
Fig-14-
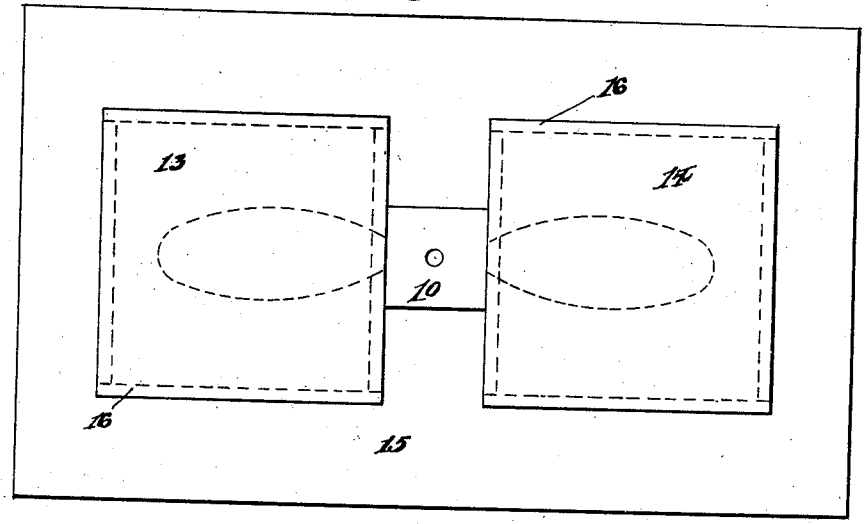
WITNESSES:
Arthur B. Wilcox
Elsie P. Grunert
INVENTOR.
Frederick W. Bull,
BY
Frank H. Allen,
ATTORNEY.

F. W. BULL.
ADJUSTABLE SECTIONAL MOLD.
APPLICATION FILED OCT. 19, 1912.
1,077,971.
Patented Nov. 11, 1913.
3 SHEETS—SHEET 3.
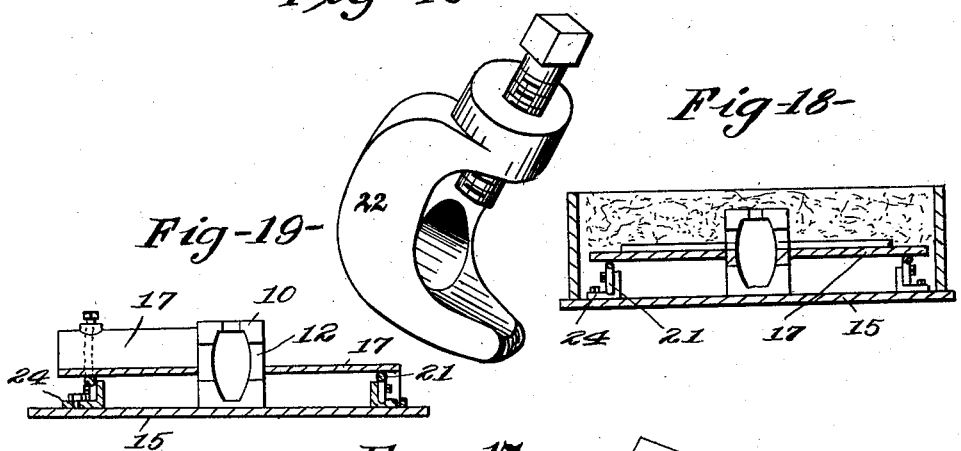
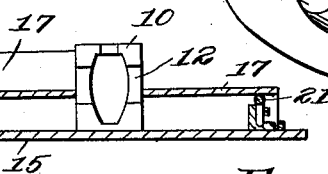
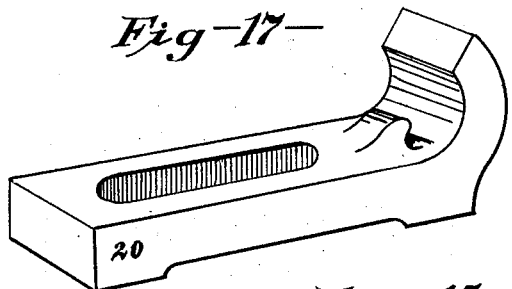
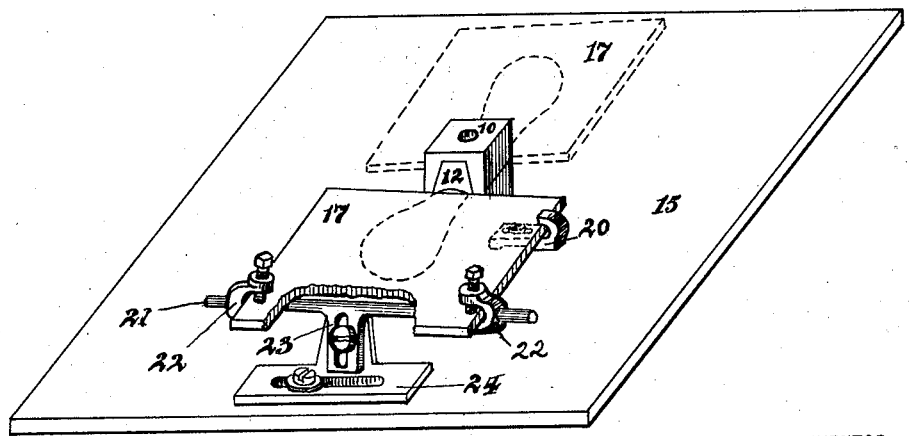
WITNESSES:
INVENTOR,
Frederick W. Bull,
BY
Frank H. Allen
ATTORNEY.

UNITED STATES PATENT OFFICE.

FREDERICK W. BULL, OF NEW LONDON, CONNECTICUT.

ADJUSTABLE SECTIONAL MOLD.

1,077,971.  Specification of Letters Patent.  Patented Nov. 11, 1913.

Application filed October 19, 1912. Serial No. 726,721.

*To all whom it may concern:*

Be it known that I, FREDERICK W. BULL, a citizen of the United States, residing at New London, in the county of New London and State of Connecticut, have invented a certain new and useful Improvement in Adjustable Sectional Molds, of which the following is a specification, reference being had to the accompanying drawings.

The immediate object of this invention is to provide an adjustable, sectional, mold for producing accurately, cheaply and rapidly, castings of variable size and pitch of that type or class which includes propeller wheels or so called screws, and my said invention contemplates a system and means whereby a single specially constructed mold set for a screw of given diameter, may be utilized to produce either right hand, or left hand, screws of different pitches and shapes, thus obviating the necessity of making a more or less expensive special pattern for each size and each pitch of screw desired.

In order to explain my improved mold clearly, I have provided the accompanying drawings, in which—

Figure 1 is an end view of a two-blade propeller wheel or screw. Figs. 2 to 12 illustrate various successive steps in the operations of using my improved mold including the apparatus necessary, or desirable, for carrying into successful effect, the molding of a screw of the general form shown in said Fig. 1. Fig. 2 is a perspective view of a two-part hub mold and Fig. 3 is a central, vertical, sectional view of the same. Fig. 4 is a cast of plaster-of-Paris, or other suitable material, that may be easily worked, and reformed. Fig. 5 illustrates the same cast after its opposite sides have been cut down, and reformed, to provide (and to properly locate with respect to the hub) the necks or fillets of the blades; that is to say, the relatively narrow portion which joins the blade proper to the hub in the finished casting. Fig. 6 is a perspective view of a cast taken from the reformed side of the said hub cast thus providing a mold for the said neck or fillet as I will explain more fully later. Fig. 7 is a transverse, sectional, view taken through the longitudinal center of the cast shown in Fig. 5. Fig. 8 is a perspective view of a standard mold block upon which I form (in paraffin or other suitable plastic composition) a blade pattern in some instances, and in other instances I conform thereon a relatively thin plate of approximately uniform thickness which plate I use as a "chill" in the complete mold, as a substitute for the said standard block; thus preserving the standard block for repeated use. Fig. 9 is a transverse, sectional, view taken on line 9—9 of said Fig. 8 and Fig. 10 is a transverse, sectional view taken on the line 10—10 of said Fig. 8. Fig. 11 is a perspective view of the standard block having the described "substitute" plate conformed thereto and mounted thereon. Fig. 12 is an edge view of a blade pattern made of paraffin or the like plastic material and Fig. 13 is a transverse sectional view of a blade mold showing particularly the location of the special chill which I have described as a "substitute plate", in connection with the reference to Fig. 11. Fig. 14 is a diagrammatic (plan) view of the assembled sections of my improved mold, showing the two blade molds and the hub mold located between said blade molds. In Fig. 15 I have illustrated, in perspective, the means provided for supporting the blade chills at the desired pitch and in proper relation to the hub and fillet molds. Figs. 16 and 17 are, respectively, detached and relatively enlarged, perspective views of the clamping blocks 20 and 22. Fig. 18 is a vertical section through the completed mold cavity. Fig. 19 is a vertical section on the line $x$—$x$ of Fig. 15.

In preparing to produce a propeller wheel by my present improved system of molding, I, preferably, first provide a standard hub mold of iron, or other suitable material, which may be used repeatedly in the molding and pouring of hubs without regard to the pitch of the blades, and in the said hub mold I run a cast of plaster-of-Paris, or other non-elastic molding compound, that may be readily worked and reformed by cutting, etc. The said hub mold is indicated in the annexed drawings by the numeral 10 and is formed of two (upper and lower) companion sections which are chambered to produce a plaster cast substantially like that shown at 11 in Fig. 4 and having oppositely extending bosses upon which I lay out in pencil outline at the desired pitch, and then cut away the surrounding plaster, to provide fillets 11$^a$—11$^b$, and so that the cast assumes approximately the shape illustrated in Fig. 5 of the drawings. The said cast is then returned to its place in the metal hub mold 10 and another cast is taken off by filling in the openings 10ª, thus providing casts 12 (see Fig. 6). The cast 11 is then removed from the hub mold 10 and the casts 12, with the fillet mold openings therein, are returned to their places in the openings 10ª, thus providing a combination mold adapted for the casting of the hub and fillet portions of a propeller wheel having two oppositely located blades.

I will now describe the manner in which I provide an adjustable mold for the blade portions of said wheel. By referring to Fig. 14 of the drawings it will be seen that the complete mold is made up of the hub mold section 10 and two oppositely located blade mold sections 13 and 14, these several sections being mounted on a suitable mold board 15 to which they are "snapped" or otherwise removably secured. Each blade mold section includes a flask, or cope, 16 and an adjustable drag 17 whose upper face is conformed to the pitch and curves of the blade. In the production of this drag I first provide a standard block 18 whose upper face is doubly curved, as will be understood by reference to Figs. 8, 9 and 10 of the drawings, and upon this block I form in paraffin, or other plastic material, a blade of substantially the shape shown in Fig. 12, the said paraffin blade pattern having first been cut to proper size and outline. I then preferably mold in plaster-of-Paris, or other suitable non-elastic molding compound, a thin shell or plate 17 on the curved (upper) face of block 18 and use said plate 17 as a drag section in the flask 16; placing the blade pattern on the said drag and then ramming up the cope to provide the desired blade mold. In order to adjust the drag 17 to the desired pitch, and to retain said drag in its adjusted position, I provide supporting and clamping means substantially like that illustrated in Fig. 15 of the drawings. The hub mold, which I have already described, is first located on the mold board 15 and the double curved drag 17 is then so adjusted as to pitch and position that its upper edge will register with the straight edge of the opening in the fillet mold 12. The lower edge of said drag is then held against deflection by a hook shaped block 20 that is adjustably secured to the mold board 15, while the said drag is held at the desired pitch by a bar 21 and clamps 22 that are adjustably secured to said bar; the bar being formed with a lateral extension 23 that is adjustably clamped to a block 24 which in turn is adjustably clamped to the mold board 15, as will be best understood by reference to Fig. 15 of the drawings. Having thus located and clamped the drag the cope is closed on and the mold is ready for the pouring of the metal. It will, of course, be understood that the described operation of producing the blade mold will be repeated twice for a two-blade wheel, three times for a three-blade wheel, and so on.

In the production of the double curved block 18 I, preferably, utilize the machine described and illustrated in Patent No. 963,858, issued to me July 12th, 1910.

My described adjustable, sectional, mold is of such simple and inexpensive construction that it is quite possible and practicable to produce a large number of propellers, of different pitches (either right or left hand) with a single set of mold sections whereas, by the ordinary methods, it is necessary to provide an equally large number of expensive special patterns.

In order to mold a left hand blade, it is only necessary to turn the drag 17 a quarter of a turn, horizontally, as the top of said drag is formed with a double curved surface, as illustrated in Figs. 8, 9 and 10. By thus changing the position of the drag, the pitch of the blade is reversed.

Having thus described my invention, I claim as new and wish to secure by Letters Patent:

1. A mold for propellers comprising a separable hub-mold section, adjustable blade sections, and means for supporting the said blade sections.

2. A mold for propellers, comprising a hub section, adjustable blade sections, and intermediate fillet sections.

3. A mold for propellers, comprising a separable hub section, adjustable blade sections, means for supporting said blade sections, and fillet sections intermediate said hub section and blade sections.

4. A mold for propellers, comprising a separable hub section, blade sections including adjustable drags, means for supporting said drags, and fillet sections intermediate said hub section and drags.

5. A mold for propellers, comprising a separable hub section, adjustable blade sections, and fillet sections between the said hub section and blade sections; the said hub section being formed with lateral openings to receive and support the fillet sections.

6. A mold for propellers, comprising a separable hub mold section, a plurality of blade mold sections, and means for supporting said blade mold sections whereby they may be adjusted and supported to produce either right hand or left hand blades, said blade mold sections being changeable to mold a reverse blade.

FREDERICK W. BULL.

Witnesses:
ELSIE P. GRUNERT,
FRANK H. ALLEN.